United States Patent [19]
Yatcko

[11] Patent Number: 5,657,526
[45] Date of Patent: Aug. 19, 1997

[54] SPLIT RIDING RING FOR ROTARY CYLINDERS

[76] Inventor: Michael J. Yatcko, 28922 Edgewood Rd., Bay Village, Ohio 44140

[21] Appl. No.: 573,286
[22] Filed: Dec. 15, 1995
[51] Int. Cl.$^6$ ........................................ B23P 17/00
[52] U.S. Cl. ............... 29/416; 29/525.11; 29/898.04; 384/273
[58] Field of Search .................. 29/525.11, 416, 29/558, 898.04, 898.042; 384/549, 272, 273, 502, 503

[56] References Cited

U.S. PATENT DOCUMENTS

| | | | |
|---|---|---|---|
| 3,100,929 | 8/1963 | Nisper | 29/416 |
| 3,255,510 | 6/1966 | Josephson et al. | 29/898.042 |
| 4,611,373 | 9/1986 | Hazebrook | 29/558 |
| 4,732,492 | 3/1988 | Bonfils | 29/898.042 |
| 5,466,410 | 11/1995 | Mills | 264/172.11 |

FOREIGN PATENT DOCUMENTS

| | | | |
|---|---|---|---|
| 0254109 | 11/1912 | Germany | 384/502 |
| 0198257 | 5/1923 | United Kingdom | 384/502 |

*Primary Examiner*—S. Thomas Hughes
*Assistant Examiner*—Marc W. Butler
*Attorney, Agent, or Firm*—Ralph H. Dougherty; Christopher C. Dremann

[57] ABSTRACT

A method for fabricating and installing a split riding ring for use on rotary cylinders that eliminates the need to remove associated equipment from the rotary cylinders to repair and install a new riding ring. The apparatus consists of a riding ring forged in one piece and machined and stress relieved. Both sides of the annular ring are then provided with opposing side pockets. Side plates are positioned within the side pockets and held in place by a first set of bolts located within drill and tapped holes. Holes are drilled through the side pockets, side plates and the riding ring. The side plates are removed and the one piece ring is cut at a forty five degree angle with its central axis of rotation to form a first and second segment and shims are attached to both segments to compensate for the metal loss. A second set of bolts are inserted through the holes in the side pockets and the side plates to form a body bound fit and the completed split ring assembly.

2 Claims, 4 Drawing Sheets

SPLIT RIDING RING FOR ROTARY CYLINDERS

FIELD OF THE INVENTION

The present invention relates to a method and apparatus for producing a split riding ring for use on rotary cylinders and more particularly to a split riding ring for use on equipment in the foundry industry.

BACKGROUND OF THE INVENTION

In the foundry industry, rotary cylinders are used on various pieces of equipment such as kilns, mixers, dryers, coolers, screens, mills, furnaces, blenders, and calciners. All of these pieces of equipment rotate on either two or more forged steel races which are called riding rings. Riding rings are steel forgings usually machined in one piece and shop mounted in one piece when the rotary unit is fabricated. After an extensive time in use, these rings develop surface cracks and must be replaced. Replacement of damaged or worn rings is very time consuming and expensive because of the size of the rotary cylinders, sometimes ten to twelve feet in diameter and two hundred fifty feet long. Many parts must be disassembled before the ring may be removed from the end of the drum. Rotary cylinders vary in size from small 2'–3' diameter units, to 10'–12' diameters×250' long limestone or cement kilns which could require five or six rings. Depending on the particular situation, the repair could cost from thousands to hundreds of thousands of dollars in labor and loss of production.

The split riding ring design eliminates the need to remove associated equipment, feeding or removing product from the rotary drum such as conveyors, feeders, breechings, dust hoods, ducts, etc. The split ring design has not been available until this time because when the one piece ring was split and reattached, the reattachment methods used have not been reliable and have caused maintenance problems. The split riding ring as disclosed has resolved these problems and has performed as well as a one piece unit. The shear stress under tension with the splice used in this invention is some ten times stronger than the forging itself.

DESCRIPTION OF THE PRIOR ART

Applicant is aware of the following U.S. patents concerning rotary cylinders.

| US Pat. No. | Inventor | Issue Date | Title |
| --- | --- | --- | --- |
| 2,041,318 | Berger | 05-19-1936 | ROASTING MACHINE |
| 2,999,396 | Kaczmarski | 09-12-1961 | DRIVE FOR ROTARY DRUMS |
| 4,209,175 | Bliemeister | 06-24-1980 | ARTICULATED SEAL FOR ROTATING CYLINDER SUCH AS KILN OR THE LIKE |
| 4,280,707 | Bliemeister | 07-28-1981 | SEAL FOR ROTATING CYLINDER SUCH AS KILNS AND THE LIKE |
| 4,385,453 | Withers, Jr. | 05-31-1983 | END PANEL INSULATOR ASSEMBLY FOR TEMPERATURE CONTROLLED ROTARY CYLINDER |
| 4,395,455 | Withers, Jr. | 05-31-1983 | ROTARY CYLINDER END WALL INSULATOR WITH SEAL |
| 4,430,809 | Jackson | 02-14-1984 | FRONT DRUM ACCESS AND SUPPORT FOR DRYER |
| 4,502,808 | Didion | 03-05-1985 | LINER SEGMENTS RETENTION MEANS |
| 4,674,691 | Didion | 06-23-1987 | DUAL SAND RECLAIMER |
| 4,981,581 | Didion | 01-01-1991 | DUST COLLECTION HOOD FOR SAND RECLAIMER, COOLING, AND BLENDING ROTARY DRUM |
| 5,016,827 | Didion | 05-21-1991 | SAND RECLAIMING DRUM |
| 5,095,968 | Didion | 03-17-1992 | ROTARY MEDIA DRUM WITH COOLING COMPONENT |
| 5,267,603 | Didion | 12-07-1993 | SAND RECLAIMING DRUM WITH MEDIA RECYLCER |

Berger, U.S. Pat. No. 2,041,318, teaches a roasting machine which may be easily operated by an unskilled operator in the process of roasting nuts.

Kaczmarski, U.S. Pat. No. 2,999,396, provides a rotary drum drive to be used while treating various solid materials.

Bliemeister, U.S. Pat. No. 4,209,175, teaches a seal for use in sealing an annular opening between a stationary member and a rotating cylinder telescopically arranged in the stationary member. The seal comprises an annular ring member circumscribing the cylinder adjacent the stationary member and closing the annular opening. The seal comprises weighing means extending axially away from a back side of the ring member to provide a counterweighing effect which causes a tilting of the ring member, whereby said tilting and the rotation of the cylinder moves the ring member into engagement with the stationary member to substantially seal the annular opening. The annular ring member is divided into a plurality of circumferentially extending segments in which adjacent segments are pivotally connected to each other to permit articulation of the segments to accommodate "out of round" portions of the rotating cylinder.

Bliemeister, U.S. Pat. No. 4,280,707, teaches a seal for use in sealing an annular opening between a stationary member and a rotating cylinder telescopically arranged in the stationary member. The seal comprises an annular ring member circumscribing the cylinder adjacent the stationary member and closing the annular opening. The seal comprises weighing means extending axially away from a back side of the ring member to provide a counterweighing effect which causes a tilting of the ring member, whereby said tilting and the rotation of the cylinder moves the ring member into engagement with the stationary member to substantially seal the annular opening.

Withers, U.S. Pat. No. 4,385,453, teaches a lightweight pliable heat and noise end panel insulator panel which is mounted to the exterior surface of the axial end wall of a temperature controlled cylinder. The insulator panel comprises multiple layers of heat and noise insulation material and relatively non-stretchable material stitched and grommeted together whereby a pattern of pockets are formed to hold the fragile heat insulation in place. The panel defines a central opening and a slot extending from the central opening through the outer peripheral edge portion so that the panel can be positioned about the axle of the cylinder.

Withers, U.S. Pat. No. 4,385,455, teaches a lightweight pliable heat and noise end panel insulator blanket which is mounted to the exterior surface of the axial end wall of a temperature controlled cylinder. The insulator blanket comprises multiple layers of heat and noise insulation material, and the blanket defines a central opening and a slot extending from the central opening through the outer peripheral edge portion so that the blanket can be positioned about the axle of the rotary cylinder. The insulator blanket includes an annular protrusion just inwardly of its outer periphery for placement against the exterior surface of the axial end wall of the rotary cylinder to form a seal between the insulator blanket and the rotary cylinder. The outer peripheral potion of the insulator blanket extends about the connector screws of the rotary cylinder while the annular seal of the insulator blanket is urged by centrifugal force toward a sealed relationship between the insulator blanket and the axial end wall of the rotary cylinder.

Jackson, U.S. Pat. No. 4,430,809, teaches a clothes dryer with a non-circular front access opening with a split ring bearing attached to the dryer drum in a manner to allow for expansion and contraction of the bearing relative to the drum and which rides on a support ring which is attached to and conforms to the access opening, thereby providing a front support for the drum.

Didion, U.S. Pat. No. 4,502,808, provides formation of a resilient retention rod or pin that inserts intermediately a pair of liner segments of a tumbling or casting shake-out unit, and a rod which is formed having a series of inherent angular bends provided along its length, and being constructed of resilient material, so that as the rod is forcefully inserted in place for retaining a pair of adjacent liner segments together, the tendency of the resilient rod to achieve its steady state angularly bent condition has a tendency to continuously force a pressure against adjacent segments to assure their tightness in interfitting together for forming the liner or cylinder for a casting shake-out unit or the like.

Didion, U.S. Pat. No. 4,674,691, teaches a dual sand reclaimer which comprises a drum formed of an inner and outer cylinder, substantially along its length, the drum being formed into three segments, an entrance segment wherein the castings are initially deposited for removal of its green mold sand, the inner cylinder thereat being perforated to provide for separation of the sand from its castings, a middle segment wherein the castings and internally arranged mold sand are subjected to abrasive members that remove any core sand, and a third or discharge segment from which the casting exit, and having an inner cylinder thereat perforated to provide for the passage of the core sand and abrasive members therethrough, with the sand being screened for removal thereat, while the abrasive members are returned by vanes arranged intermediate the inner and outer cylinders of the middle segment of the drum for a return to the leading end of the segment for reusage.

Didion, U.S. Pat. No. 4,981,581, teaches a dust collecting hood for use in conjunction with a sand cooling, blending, reclaiming of other rotary drum, within the casting industry, the hood incorporates an upper and lower section either of unitary or separate construction, the upper section including a discharge opening which cooperates with a vacuum pump to draw air through the hood, and the proximate discharge end of the rotary drum, while the lower section of the hood provides a discharge opening for removal of the mold sand from the drum, the hood, at this collection location, while further incorporating ports through which air may pass for forming the air curtain across the associated hood and drum, for removal of said fines, dust and other deleterious particles from the ambient air.

Didion, U.S. Pat. No. 5,016,827, teaches a sand reclaiming drum which incorporates a single cylinder, or structure having a dual cylinder reclaimer. The sand reclaiming drum comprises four sections: an inlet section into which mold castings are introduced, first and second inner sections, and an outlet section. The inlet and first inner sections include helical rifling which urge the castings forward. The first and second inner sections include plates which greatly agitate the castings to loosen embedded sand therefrom. The outlet section includes a plurality of perforations along its length through which the sand may exit the drum and ejection means to urge the sand free castings from the reclaimer.

Didion, U.S. Pat. No. 5,095,968, provides a media drum which incorporates an inner and outer cylinder, having a helical vane located generally intermediate thereof, with the media drum being supported upon a base, and its bearings, and motivated into rotation by a drive motor. The media drum integrally contains two parts, an entrance segment, and an exit segment. At the exit segment, a cooling component in the form of a liquid spray, is either directed into the drum, or into a jacket surrounding the exit segment of the drum, for cooling of the castings, media sand, abrasive members, to achieve a rapid cool down of these various components during usage of the apparatus. A reservoir is provided for collecting any excess liquid coolant, and a steam jacket surrounds the drum for collecting any generated steam for its removal.

Didion, U.S. Pat. No. 5,267,603, teaches a drum which incorporates an inner and outer cylinder, having a helical vane located intermediate thereof, with the media drum being supported upon a base and rotated by a drive motor. The drum contains two parts, an entrance segment and an exit segment. At the exit segment, reclaiming media and sand passes into the space between the inner and outer cylinders, and is carried to the entrance segment by the helical vanes. At the entrance segment, the media is picked up by a reclaimer which reintroduces the media into the reclaimer to recycle the media.

SUMMARY OF THE INVENTION

The invention provides a method and apparatus for installing a riding ring on a rotary cylinder without the need to disassemble any perpherial equipment that would be necessary if installed over its end as is usually the case.

For the purpose of this specification and claims a "riding ring" is defined as an integral track or race that fits on a rotary cylinder and guides the cylinder during rotation and attaches to the main outer shell by a wedging arrangement between the ring and the outer shell with side chocks also mounted to the outer shell to maintain vertical alignment of the ring.

The apparatus consists of a riding ring forged in one piece and machined. Both sides of the annular ring are then provided with opposing side pockets. Side plates are inserted into the pockets and bolted with two tapped holes each. This procedure is repeated in each of the four side pockets. Once completed, three holes are drilled and reamed through the plates and the full width of the riding ring. The plates are removed and the one piece ring is cut at a forty-five degree angle with its central axis of rotation to form a first and second segment. A shim is provided for each forty-five degree cut, thus, a ferrous metal shim plate is fabricated and attached to opposite sides of one segment of the split riding ring. The plates are reinserted into the pockets and are bolted with two tapped holes each. The final assembly is completed by driving through three remaining body bound bolts that secure the two ring halves together across the forty-five degree cut.

OBJECTS OF THE INVENTION

The principal object of the present invention is to provide an improved method for producing a riding ring for rotary cylinders in a two piece design while retaining the shear strength and integrity of a one-piece design.

The second object of this particular splice is the advantage of savings in using only one steel forged ring instead of two. The shear stress under tension with this splice is some ten times stronger at the splices than the forging itself.

A further object of this invention is the 45 degree cut of the ring at both splices. This style cut allows a smooth transition over the splices and the use of the three center body bound shoulder bolts as dowel pins through the saw cut.

Another object of the invention is that it expedites the repair of a serious and costly problem and will save the user a substantial amount of money, approximately some (85%) of the replacement cost to make a necessary repair.

BRIEF DESCRIPTION OF THE DRAWINGS

The foregoing and other objects will become more readily apparent by referring to the following detailed description and the appended drawings in which.

DETAILED DESCRIPTION

Figure 1:
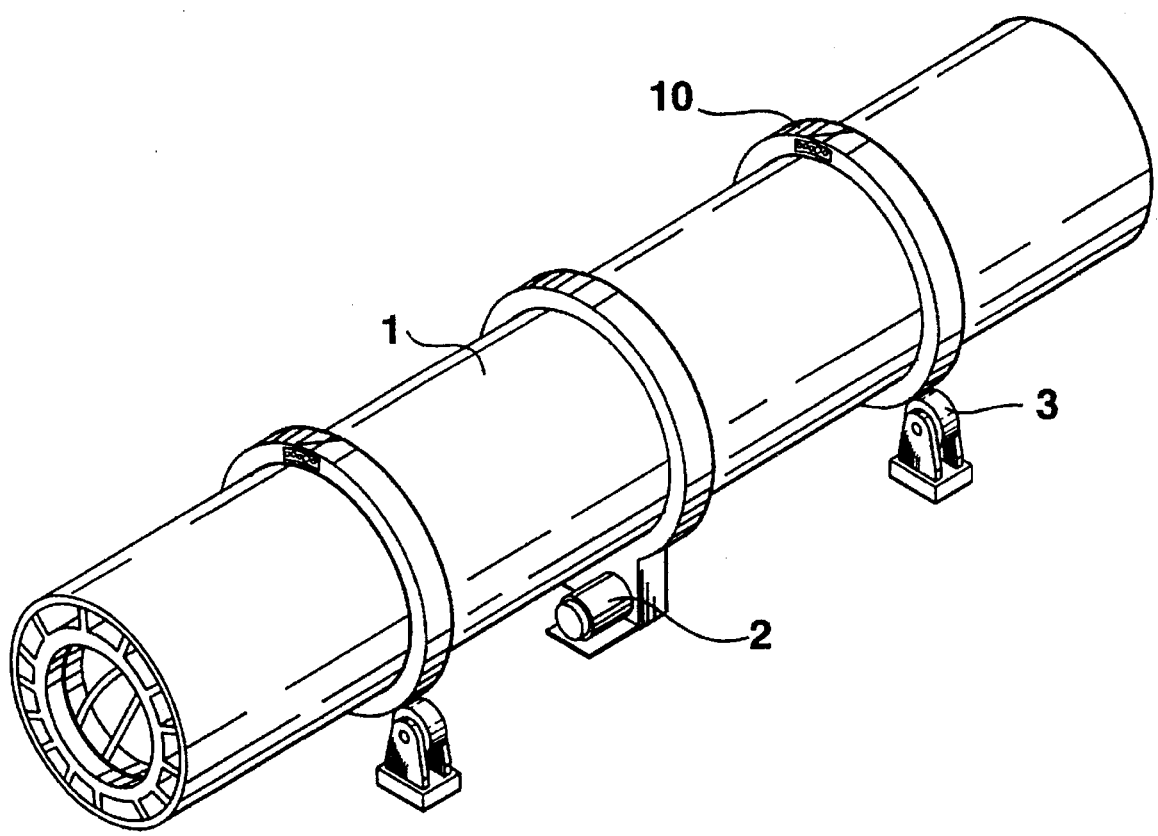
FIG. 1 is a perspective view of a rotary cylinder with a base and split riding rings.
Figure 2:
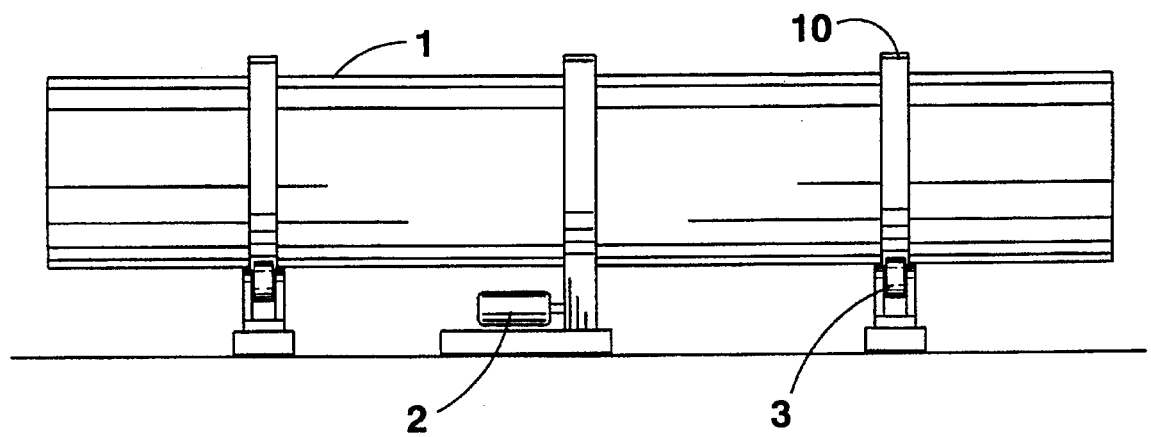
FIG. 2 is a side elevational view of the rotary cylinder with its base.
Figure 3:
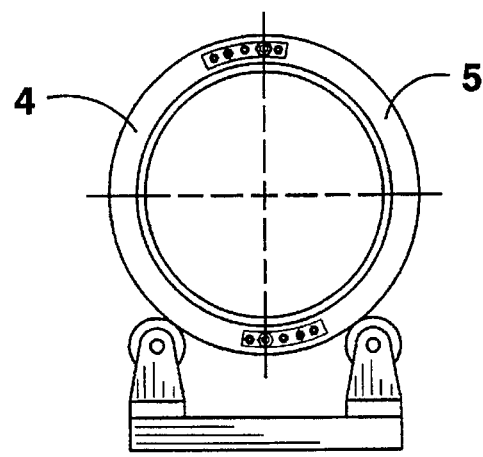
FIG. 3 is an end view of the split riding ring.

Referring now to the drawings, and particularly to FIG. 1, a rotary drum 1 which is rotated by a drive means 2 and guided by rollers 3 has a riding ring 10 which attaches to the cylinder. The riding ring of this invention is of a split ring design as shown in FIG. 3. A ring 10 having a first and second side surface is split to form a first segment 4 and a second segment 5.

Figure 4:
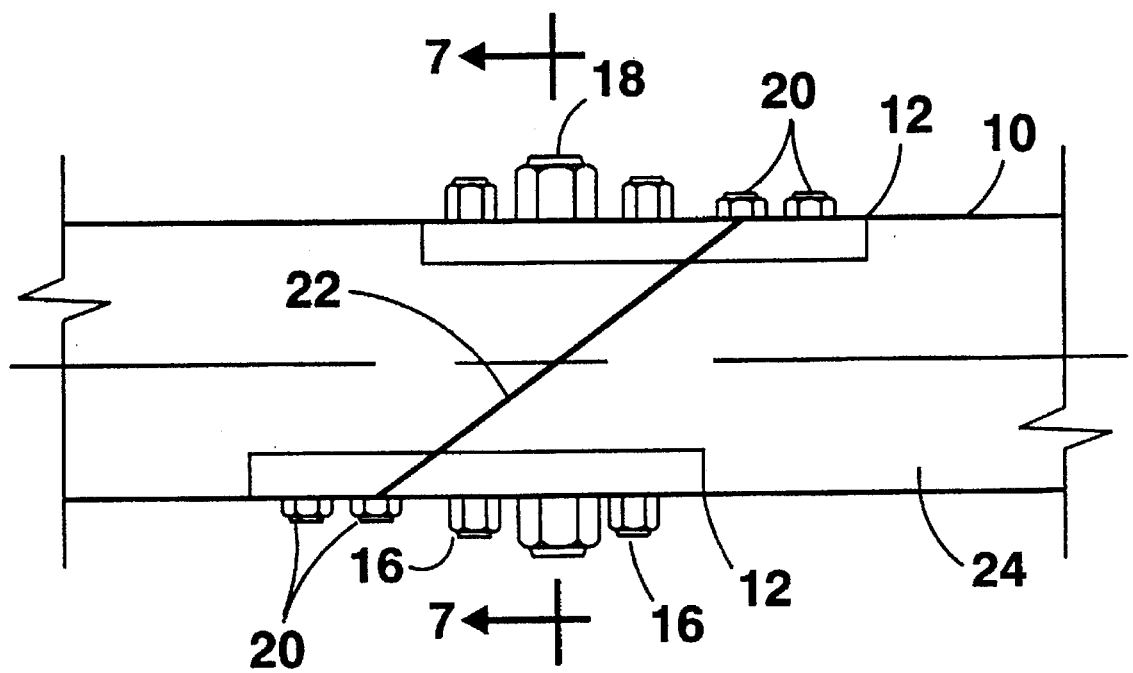
FIG. 4 is a top view of the split riding ring design showing the splice at 45 degrees and the bolt arrangement that holds the two pieces.

This is accomplished by forging a one piece riding ring and machining the riding ring perfectly round for precise rotation. As shown in FIG. 4, side pockets 12 are provided in each of the first and second opposing side surfaces. Side plates 14 are fabricated and precisely fit into the side pockets 12. The side plates and the opposing side pockets are connected by holes 32 drilled through each side plate and the riding ring 10. The holes 32 are drilled through the side plates 14 in the pockets 12 and through the riding ring 10 to form a body bound interference fit. Each split riding ring application has different size bolts to fit the size of the riding ring. The size of the bolts is determined by the thickness and width of the ring to be split. Once the opposing side pockets 12 are formed, the side plates 14 are precisely fit into the side pockets 12. A first set of bolts 20 are positioned into drilled and tapped holes located on both the inside surface 26 and the outside surface 28 of the first segment 4 and the second segment 5, the first set of bolts are installed to further strengthen the split riding ring and to protect the outer edges of the forty-five degree sawcut during its high speed and high shear stress application. Holes 32 are drilled and reamed through the plates and ring, the ring is then ready to be split. The side plates are removed and the ring is cut from the top surface to the bottom surface of the ring 10 to form a splice 22 and the cut is at a forty-five degree angle to the center of the ring and across the side pockets and holes. A second set of bolts which includes a larger diameter center bolt 18 with nut and two smaller diameter side bolts 16 with nut are precisely fit into the holes 32 and connect the first segment 4 to the second segment 5 at opposite ends to form the split ring design. The second set of bolts 16 and 18 are machined to fit the drilled and reamed holes and positioned to form a body bound fit. The second set of bolts may also be of the same size diameter depending on the size of the split riding ring.

ALTERNATIVE EMBODIMENTS

Figure 5:
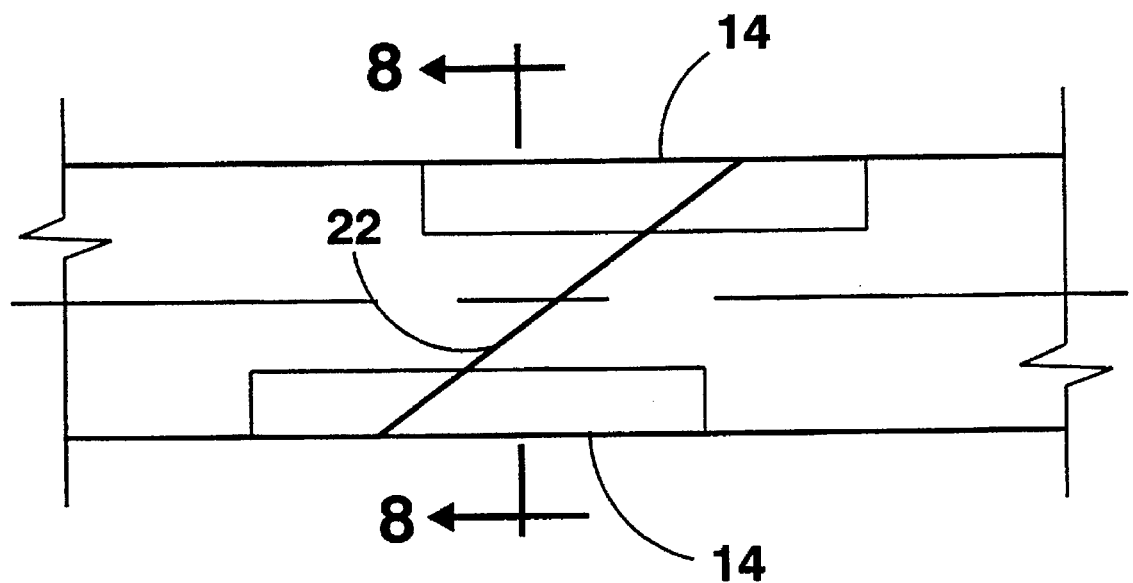
FIG. 5 is a top view of a second embodiment of the invention showing the splice at 45 degrees with the bolts recessed within the opposing side pockets.
Figure 6:
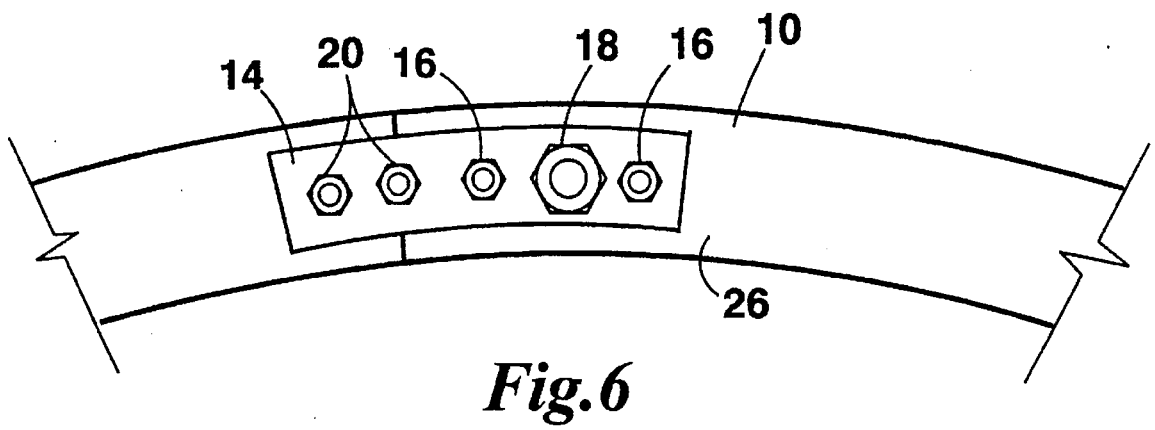
FIG. 6 is an enlarged side view of the riding ring with milled out pockets, side plates and bolts inserted into the front face.
Figure 7:
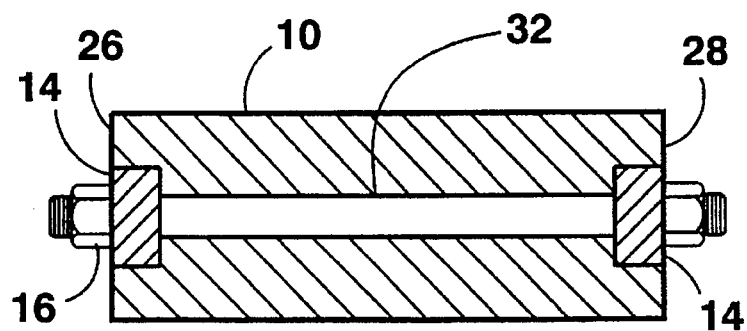
FIG. 7 is a cross-section through the ring as shown in FIG. 4.
Figure 8:
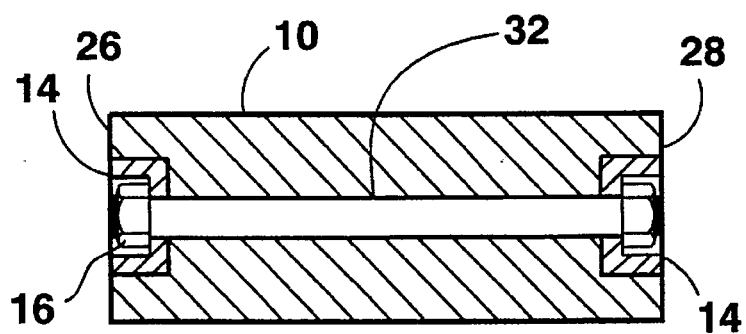
FIG. 8 is a cross-section of a second embodiment of the invention with the bolts recessed within the opposing side pockets as shown in FIG. 5.

In a second embodiment as shown in FIGS. 5 and 8, the first and second set of bolts for connecting the first and second segments are recessed into the side plates 14 and riding ring 10 such that the bolts do not extend beyond the face of the inside surface 26 and the outside surface 28 of the split riding ring. This design is used on rotary cylinders where the guide wheel 3 engages the riding ring on the inside and outside surfaces of the ring and not on the top surface of the ring.

SUMMARY OF THE ACHIEVEMENT OF THE OBJECTS OF THE INVENTION

From the foregoing, it is readily apparent that I have invented an improved method and apparatus for fabricating riding rings for rotary cylinders. The split riding ring as disclosed may be installed without the removal of any equipment besides the worn ring and retains its integrity such that the shear stress under tension is stronger that the initial forging itself.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A method of splitting a riding ring for a rotary cylinder comprising the steps of:

providing a one piece annular riding ring having an inside surface, an outside surface, a top surface and a bottom surface;

providing the riding ring with opposed side pockets in a portion of the inside surface and in a portion of the outside surface of the riding ring at two diametrically opposed locations;

fabricating side plates sized to fit within each of the opposed side pockets formed in the riding ring;

attaching each of the side plates to the riding ring within the opposed side pockets with a first set of threaded bolts received in a first set of holes drilled and tapped into the inside surface and into the outside surface of the riding ring;

drilling and reaming a second set of holes into the inside surface and into the outside surface of the riding ring within the opposed side pockets so that the second set of holes extend completely through the side plates and the riding ring;

removing the first set of bolts and the side plates from within the opposed side pockets of the riding ring;

cutting completely through the riding ring from the top surface to the bottom surface at an angle joining the opposed side pockets to form a riding ring that is split at each of the two diametrically opposed locations;

replacing the side plates and the first set of bolts within the opposed side pockets; and securing the side plates and the split riding ring together with a second set of bolts received in the second set of holes to form a split annular riding ring.

2. A method of splitting a riding ring according to claim 1 wherein the cutting step comprises cutting completely through the riding ring from the top surface to the bottom surface at an angle of forty-five degrees relative to the central axis of rotation of the riding ring.

* * * * *